United States Patent
Yang et al.

(10) Patent No.: US 9,824,613 B2
(45) Date of Patent: Nov. 21, 2017

(54) LIQUID DISPLAY PANEL AND METHOD FOR DETECTING ELECTRIC POTENTIAL GENERATED BY IONS BETWEEN LIQUID CRYSTAL LAYER AND ALIGNMENT FILM

(71) Applicant: InnoLux Corporation, Miao-Li County (TW)

(72) Inventors: Kei-Hsiung Yang, Miao-Li County (TW); Hsu-Kuan Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 211 days.

(21) Appl. No.: 14/821,843

(22) Filed: Aug. 10, 2015

(65) Prior Publication Data
US 2016/0086528 A1 Mar. 24, 2016

(30) Foreign Application Priority Data
Sep. 19, 2014 (TW) .............................. 103132368 A

(51) Int. Cl.
*G02F 1/1333* (2006.01)
*G02F 1/1337* (2006.01)
(Continued)

(52) U.S. Cl.
CPC ........... *G09G 3/006* (2013.01); *G02F 1/1309* (2013.01); *G02F 1/13306* (2013.01);
(Continued)

(58) Field of Classification Search
CPC ............... G02F 1/1337; G02F 1/13439; G02F 1/13306; G02F 1/1309; G02F 2203/69; G02F 2001/133397; G09G 3/006
See application file for complete search history.

(56) References Cited

U.S. PATENT DOCUMENTS

2008/0309837 A1* 12/2008 Abe ..................... G09G 3/3614
349/37
2009/0102765 A1* 4/2009 Kawahara ........... G09G 3/3611
345/87
2012/0147279 A1 6/2012 Koyanagi et al.

FOREIGN PATENT DOCUMENTS

TW 200523835 A 7/2005
TW 201037267 A 10/2010
(Continued)

*Primary Examiner* — Jia Pan
(74) *Attorney, Agent, or Firm* — Bacon & Thomas, PLLC

(57) ABSTRACT

A liquid display panel is disclosed, which comprises: a first substrate; a second substrate; a first electrode and a second electrode disposed between the first substrate and the second substrate, wherein the first electrode and the second electrode have different electric potentials; a first alignment film disposed between the first electrode and the second electrode; and a liquid crystal layer disposed between the first substrate and the second substrate, wherein when a working frequency of the liquid crystal display panel is N Hz, ionic electric potentials of the liquid crystal layer and the first alignment film satisfy the following Equation (I):

$$0 \leq \left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right| \leq 0.5 \quad (I)$$

wherein $0.1 \leq N \leq 30$, $V_{ion\_LC}(1/2N)$ refers to an ionic electric potential of the liquid crystal layer at a time of $1/2N$, and $V_{ion\_PI}(1/2N)$ refers to an ionic electric potential of the first alignment film at a time of $1/2N$.

10 Claims, 10 Drawing Sheets

(51) Int. Cl.
*G02F 1/1343* (2006.01)
*G02F 1/133* (2006.01)
*G02F 1/13* (2006.01)
*G09G 3/00* (2006.01)

(52) U.S. Cl.
CPC ............... *G02F 1/1337* (2013.01); *G02F 2001/133397* (2013.01); *G02F 2203/69* (2013.01)

(56) References Cited

FOREIGN PATENT DOCUMENTS

| | | |
|---|---|---|
| TW | 201416755 A | 5/2014 |
| TW | 201421440 A | 6/2014 |

* cited by examiner

LIQUID DISPLAY PANEL AND METHOD FOR DETECTING ELECTRIC POTENTIAL GENERATED BY IONS BETWEEN LIQUID CRYSTAL LAYER AND ALIGNMENT FILM

CROSS REFERENCE TO RELATED APPLICATION

This application claims the benefits of the Taiwan Patent Application Serial Number 103132368, filed on Sep. 19, 2014, the subject matter of which is incorporated herein by reference.

BACKGROUND

1. Field of the Invention

The disclosure relates to a liquid crystal display panel and a method for detecting electric potential generated by ions between liquid crystal layer and alignment film, and especially to a liquid crystal display panel suitable for low frequency operation and a method for detecting electric potential generated by ions between liquid crystal layer and alignment film.

2. Description of Related Art

With the progressive development of display technology, all the devices are developed following the trend of minimization, thinness, light weight and so on, and the mainstream display devices have evolved from cathode ray tubes to the liquid crystal displays. In particular, the liquid crystal displays can be applied in various fields of daily life, such as a mobile phone, a notebook computer, a camcorder, a camera, a music player, a mobile navigation device, a television and the like, in which a liquid crystal display panel is typically used as their display panels.

A common liquid crystal display panel includes a liquid crystal layer sandwiched between two electrodes, and the tilting of the liquid crystal molecules in the liquid crystal layer is controlled by a voltage, to vary the phase characteristics of the passing light, and by the use of polarizers, the light emitted by the backlight module disposed under the liquid crystal panel may pass through the liquid crystal layer or not, thereby achieving the purpose of the display.

When the liquid crystal display panel is operated at a high frequency, the ions of the liquid crystal layer or the alignment film materials have a smaller influence on the display quality of the display panel; however, when it is operated at a low frequency, the electric field caused by the ionic charges will significantly influence the actual electric potential imposed on the liquid crystal molecules in the liquid crystal layer, resulting in the problem such as image sticking, flicker, over low voltage retention and so on, which are also important factors for negatively affecting the quality of the liquid crystal display panel.

In view of the above, what is needed in the art is to develop a method for detecting electric potential generated by ions between the liquid crystal layer and the alignment film in the liquid crystal display panel, through which a suitable liquid crystal material and an alignment film material can be selected to manufacture a liquid crystal display panel having a high display quality under a low frequency operation.

SUMMARY

An object of the disclosure is to provide a liquid crystal display panel which can be operated at a low-frequency voltage, preventing the display panel from flicker caused by influence of the ions of the alignment film material and the liquid crystal molecules.

Another object of the disclosure is to provide a method for detecting electric potential generated by ions between the liquid crystal layer and the alignment film in the liquid crystal display panel, to thereby monitor the variation of the electric field generated by the ionic electric potential difference between the liquid crystal molecules and the alignment film material and reduce the ion impact on the quality of the liquid crystal display.

In order to achieve the above object, the disclosure provides a liquid display panel, comprising: a first substrate; a second substrate disposed opposite to the first substrate; a first electrode disposed between the first substrate and the second substrate; a second electrode disposed between the first substrate and the second substrate, wherein the first electrode and the second electrode have different electric potentials; a first alignment film disposed between the first electrode and the second electrode; and a liquid crystal layer disposed between the first substrate and the second substrate, wherein when a working frequency of the liquid crystal display panel is N Hz, ionic electric potentials of the liquid crystal layer and the first alignment film satisfy the following Equation (I):

$$0 \leq \left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right| \leq 0.5 \qquad (I)$$

wherein $0.1 \leq N \leq 30$, $V_{ion\_LC}$ (1/2N) refers to an ionic electric potential of the liquid crystal layer at a time of 1/2N, and $V_{ion\_PI}$(1/2N) refers to an ionic electric potential of the first alignment film at a time of 1/2N.

In the liquid crystal display panel of the disclosure, appropriate materials of the liquid crystal layer and alignment film are so selected to make the ionic electric potentials of the liquid crystal layer and the alignment film satisfy the above Equation (I) when the liquid crystal display panel is operated at a low frequency, thus reducing the impact of the ions of the liquid crystal layer and the alignment film, and improving the display quality of the liquid crystal display panel.

The liquid crystal display panel of the disclosure may further comprise a second alignment film disposed between the first electrode and the second electrode and opposite to the first alignment film, and the liquid crystal layer is disposed between the first alignment film and the second alignment film. In addition, the liquid crystal display panel of the disclosure may be a liquid crystal display panel well-known in the art, such as a twisted alignment, vertical alignment or horizontal alignment liquid crystal display panel. That is, the first and second electrodes may be both disposed on the first substrate, or the first electrode is disposed on the first substrate while the second electrode is disposed on the second substrate.

Further, the disclosure further provides a method for detecting an electric potential generated by ions between a liquid crystal layer and an alignment film in a liquid crystal display panel, comprising the following steps: providing a liquid crystal display panel, comprising: a first substrate; a second substrate disposed opposite to the first substrate; a first electrode disposed between the first substrate and the second substrate; a second electrode disposed between the first substrate and the second substrate, wherein the first electrode and the second electrode have different electric potentials; a first alignment film disposed between the first electrode and the second electrode; and a liquid crystal layer disposed between the first substrate and the second substrate; measuring the liquid crystal display panel by a liquid crystal current measurement method, to obtain a sum A of an ionic electric potential of the liquid crystal layer at a time of 1/2N and an ionic electric potential of the alignment film at the time of 1/2N, as shown in the following Equation (1); and measuring the liquid crystal display panel by a phase difference measurement method, to obtain a difference B between of the ionic electric potential of the liquid crystal layer at the time of 1/2N and the ionic electric potential of the alignment film at the time of 1/2N, as shown in the following Equation (2):

$$A = V_{ion\_Pl}(1/2N) + V_{ion\_LC}(1/2N) \quad (1)$$

$$B = V_{ion\_Pl}(1/2N) - V_{ion\_LC}(1/2N) \quad (2)$$

wherein 0.1≤N≤30, $V_{ion\_LC}$ (1/2N) refers to the ionic electric potential of the liquid crystal layer at the time of 1/2N, and $V_{ion\_Pl}$(1/2N) refers to the ionic electric potential of the alignment film at the time of 1/2N; and obtaining the ionic electric potential of the alignment film at the time of 1/2N and the ionic electric potential of the liquid crystal layer at the time of 1/2N via the following Equation (3) and Equation (4):

$$V_{ion\_Pl}(1/2N) = (A+B)/2 \quad (3)$$

$$V_{ion\_LC}(1/2N) = (A-B)/2 \quad (4).$$

In the detection method of the disclosure, the phase difference measurement method for measuring the liquid crystal display panel to obtain the difference between the ionic electric potentials comprises the following steps: applying a voltage having an operating frequency greater than or equal to 60 Hz and less than or equal to 5000 Hz to the liquid crystal display panel, to obtain a plot of voltage versus liquid crystal phase difference; applying a voltage having an operating frequency greater than 0 Hz and less than 10 Hz to the liquid crystal display panel, to obtain a plot of time versus liquid crystal phase difference; and comparing the plot of voltage versus liquid crystal phase difference with the plot of time versus liquid crystal phase difference, to obtain a plot of time versus ionic electric potential difference.

In addition, in the detection method of the disclosure, the liquid crystal current measurement method for measuring the liquid crystal display panel to obtain the sum of the ionic electric potentials comprises the following steps: applying a voltage having an operating frequency greater than or equal to 60 Hz and less than or equal to 5000 Hz to the liquid crystal display panel, to obtain a plot of voltage versus liquid crystal capacitance; obtaining a plot of time versus liquid crystal capacitance, from the plot of time versus ionic electric potential difference and the plot of voltage versus liquid crystal capacitance; obtaining a plot of time versus charge required for twisting liquid crystal molecules from the plot of time versus liquid crystal capacitance and the plot of time versus ionic electric potential difference; and obtaining a plot of time versus sum of ionic electric potentials from the plot of time versus charge required for twisting liquid crystal molecules and a plot of time versus current passing through the display panel.

In the detection method of the invention, the liquid crystal current measurement method is employed to obtain the sum of an ionic electric potential of the liquid crystal layer and an ionic electric potential of the alignment film, and the phase difference measurement method is employed to obtain the difference between of the ionic electric potential of the liquid crystal layer and the ionic electric potential of the alignment film, so as to calculate and obtain the ionic electric potentials of the liquid crystal layer and the alignment film material respectively to enable understanding of their individual impact. As such, the ionic characteristics of liquid crystal display panel may be monitored, allowing manufacturers to modify the liquid crystal display panel suitable for low frequency operation.

DETAILED DESCRIPTION OF THE PREFERRED EMBODIMENT

Hereafter, examples will be provided to illustrate the examples of the disclosure. Other advantages and effects of the invention will become more apparent from the disclosure of the disclosure. Other various aspects also may be practiced or applied in the invention, and various modifications and variations can be made without departing from the spirit of the invention based on various concepts and applications.

Test Example

Figure 1A:
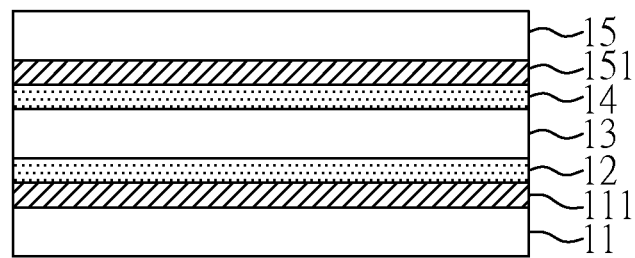
FIG. 1A shows a schematic diagram of the liquid crystal display panel used in a test example of the disclosure.

FIG. 1A shows a schematic diagram of the liquid crystal display panel used in this test example. The liquid crystal display panel used in this test example comprises: a first substrate 11; a second substrate 15 disposed opposite to the first substrate 11; a first electrode 111 disposed between the first substrate 11 and second substrate 15; a second electrode 151 disposed between the first substrate 11 and second substrate 15, wherein the first electrode 111 and the second electrode 151 have different electric potentials; a first alignment film 12 disposed between the first electrode 111 and second electrode 151; and a liquid crystal layer 13 disposed between the first substrate 11 and second substrate 15. The first electrode 111 and second electrode 151 may be patterned electrodes. In addition, the liquid crystal display panel used in the present test example further includes a second alignment film 14 disposed between the first substrate 11 and the second substrate 15 and opposite to the first alignment film 12, and the liquid crystal layer 13 is disposed between the first alignment film 12 and the second alignment film 14. In the liquid crystal display panel used in the present test example, the first electrode 111 on the first substrate 11 and the second electrode 151 on the second substrate 15 are disposed opposite to each other, and therefore, the liquid crystal display panel used in the present test example is a twisted alignment (TN) liquid crystal display panel.

Figure 1B:
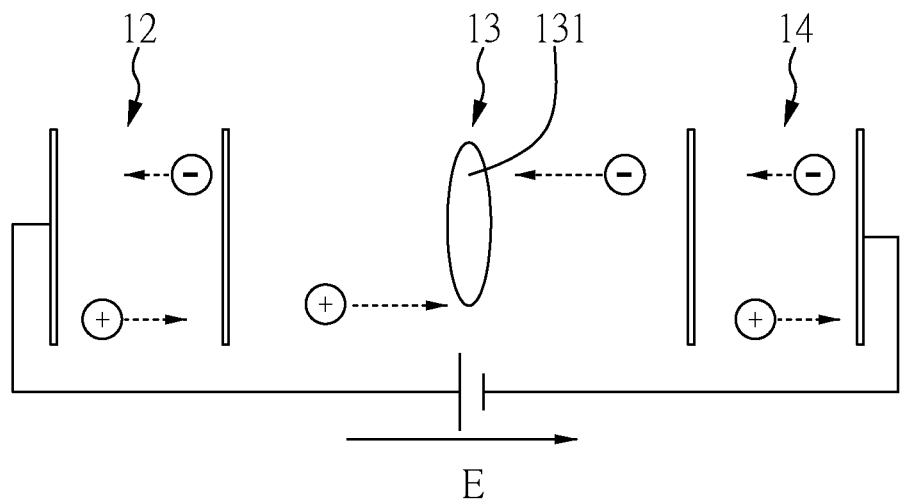
FIG. 1B shows a schematic diagram of ion action in the liquid crystal display panel used in a test example of the disclosure.

FIG. 1B shows a schematic diagram of ion action in the liquid crystal display panel used in a test example of the disclosure. When an operation voltage E is applied to the liquid crystal display panel, an electric potential difference is generated between the first electrode 111 and second electrode 151, and the liquid crystal molecules 131 of the liquid crystal layer 13 are rotated by the electric field E generated between the first electrode 111 and the second electrode 151. Meanwhile, the positive charges (positively charged ions) of the first alignment film 12, the liquid crystal layer 13 and the second alignment film 14 move towards the negative electrode, while the negative charges (negatively charged ions) thereof move towards the positive electrode. The charges at the interfaces between the liquid crystal layer 13 and the first alignment film 12 and between the liquid crystal layer 13 and second alignment film 14 will balance each other, and finally remain an internal electric field. If the alignment film has more ions, the net ionic electric field has the same direction with the external electric field, and if the liquid crystal layer has more ions, the net ionic electric field has the opposite direction to the external electric field. Such an internal electric field will affect the rotation properties of the liquid crystal molecules 131 and the optical phase of the liquid crystal layer 13, especially when operated under a low-frequency voltage. Here, it is noted that the liquid crystal molecules 131 shown in FIG. 1B are for illustrative purposes only and are not intended to limit the liquid crystal molecules to be the positive- or negative-type liquid crystal.

Therefore, in order to detect the ionic electric potentials generated by the first alignment film 12, the liquid crystal molecules 131 and the second alignment film 14, in this test example, the liquid crystal current measurement method and the phase difference measurement method are respectively used to measure the ionic electric potentials generated by the alignment films (including the first alignment film 12 and the second alignment film 14) and the liquid crystal molecules 131 after applying the voltage.

Figure 2A:
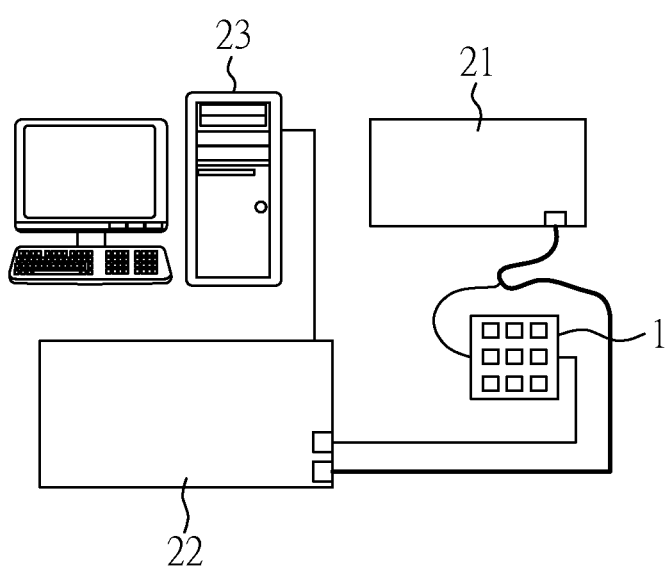
FIG. 2A shows a schematic diagram of the liquid crystal current measurement system used in a test example of the disclosure.
Figure 2B:
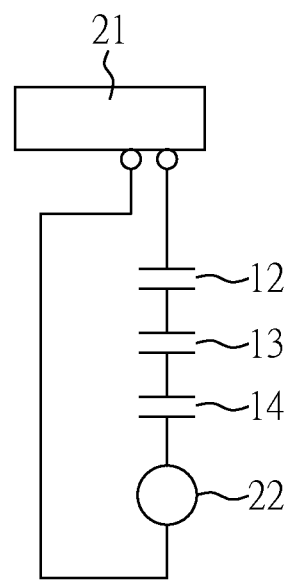
FIG. 2B shows an equivalent circuit diagram of the liquid crystal current measurement system used in a test example of the disclosure.

FIGS. 2A and 2B show the schematic diagram and the equivalent circuit diagram of the liquid crystal current measurement system used in this test example. The liquid crystal measurement system used in the present test example comprises: a signal generator 21, a semiconductor analyzer 22 and a data processor 23. The signal generator 21 is electrically connected to the liquid crystal display panel 1 used in this test example, and applies a voltage to the liquid crystal display panel 1. Also, the semiconductor analyzer 22 is electrically connected to the liquid crystal display panel 1. Here, the semiconductor analyzer 22 is Agilent 4155C, but the disclosure is not limited thereto, as long as the semiconductor analyzer 22 can detect a current of $10^{-9}$ A to $10^{-12}$ A.

Figure 3A:
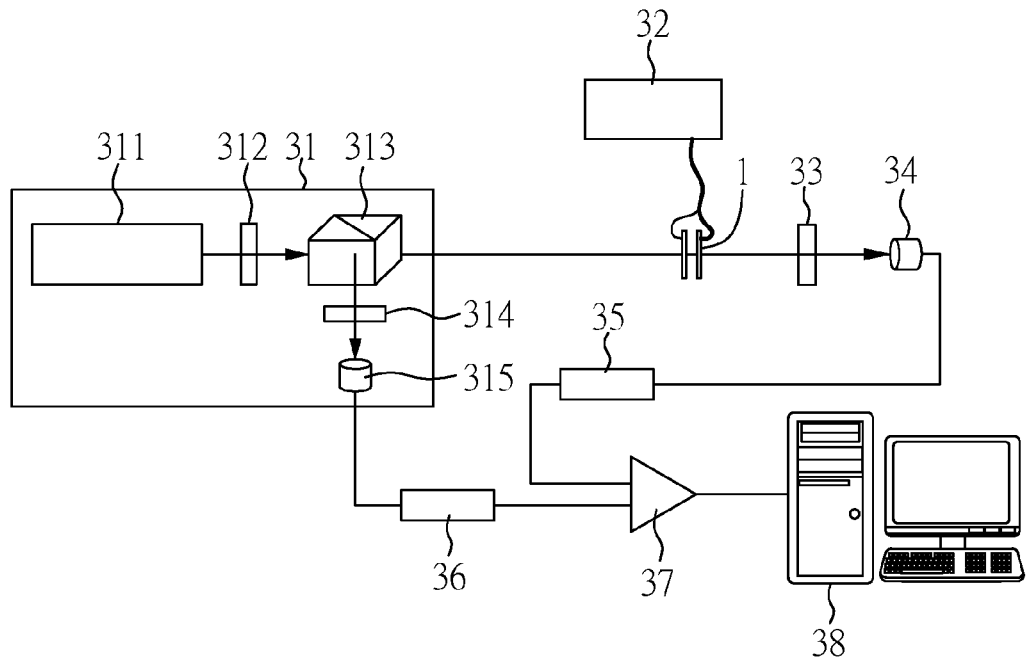
FIG. 3A shows a schematic diagram of the phase difference measurement system used in a test example of the disclosure.
Figure 3B:
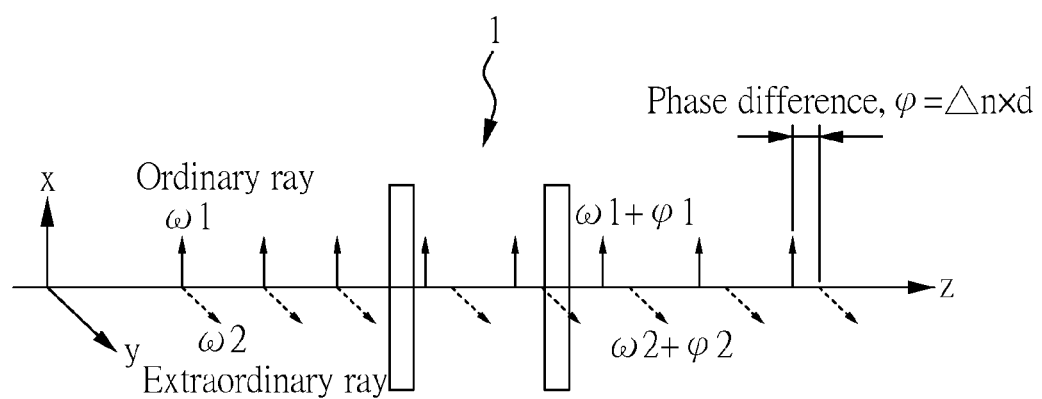
FIG. 3B shows a schematic diagram of the phase difference generated in the liquid crystal display panel according to a test example of the disclosure.

FIG. 3A shows a schematic diagram of the phase difference measurement system used in this test example. The phase difference measurement system used in the present test comprises: a heterodyne interferometer 31, a signal generator 32, a polarizer 33, a phase recorder 34, counters 35, 36, a differential amplifier 37 and a data processor 38, wherein the heterodyne interferometer 31 comprises: a laser device 311, a quarter-wave plate (QWP) 312, a beam splitting unit 313, a polarizer 314 and a phase recorder 315. Here, the laser light emitted by the laser device 311 is transmitted along the direction indicated by the arrow, and passes though the liquid crystal display panel 1 and the polarizer 33 used in this test example. In addition, the signal generator 32 is further electrically connected to the electrical panel liquid crystal display 1 to apply a voltage to the liquid crystal display panel 1. In this test example, the heterodyne interferometer 31 is Agilent 5519A, and the laser device 311 employs a Zeeman laser light having a wavelength of 633 nm and a frequency difference of 2.4 MHz. However, the disclosure is not limited thereto. In this test example, the Zeeman laser light source employed by the laser device 311 having left-handed and right-handed polarized lights are subjected to a phase retention by the quarter-wave plate 312 to form two linearly polarized light beams whose polarization direction are perpendicular to each other, as shown in FIG. 3B, wherein ω1 and ω2 represent the frequency of the ordinary ray (marked by the solid line arrow) and the extraordinary ray (marked by the dashed arrow), respectively, and the frequency difference therebetween is 2.4 MHz. A light beam is divided into two after passing through the beam splitting unit 313, wherein the reflected light will pass through the polarizing plate 314 and be received by the phase recorder 315 to serve as a reference signal; while the transmitted light will pass through the liquid crystal display panel 1 to result in a phase difference, and then pass through the polarizing plate 33, and be received by the phase recorder 34 to serve as a test signal. The phase difference generated by the orthogonal linearly polarized light beams through the liquid crystal display panel 1 is shown in FIG. 3B. Since the liquid crystal possess the birefringent characteristics, when a light passes through the liquid crystal display panel 1, the ordinary light and extraordinary light may have different phase difference φ1 and φ2, respectively. The light passing through the polarizers 314, 33 is received by the phase recorders 315, 34 to measure the light intensity of the reference signal and the test signal. Then, the light intensities are superimposed to calculate (φ=Δn xd, wherein Δn refers to the difference in refractive coefficient between the ordinary light and the extraordinary light, and d is the thickness of the liquid crystal layer in the liquid crystal display panel 1) the phase difference between the reference signal and the test signal.

Figure 4:
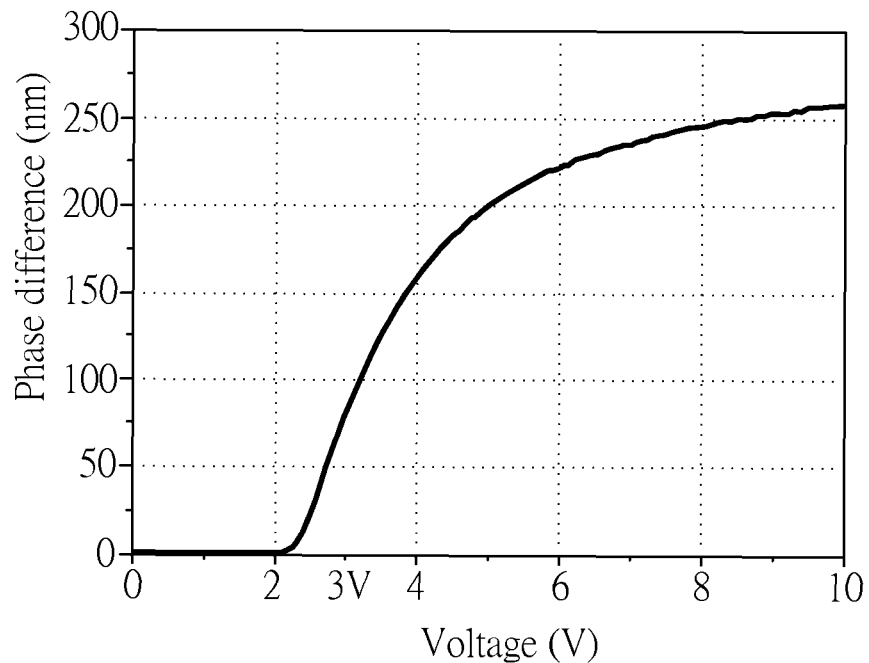
FIG. 4 shows a plot of voltage versus liquid crystal phase difference according to a test example of the disclosure.

Next, the phase measurement method used in this test example will be described in detail. First, as shown in the phase difference measurement system of FIG. 3A, a voltage having an operating frequency greater than or equal to 60 Hz and less than or equal to 5000 Hz is applied to the liquid crystal display panel 1, to obtain a plot of voltage versus liquid crystal phase difference (ΔPhase vs. Voltage). In this test example, a voltage of 0V to 10V having a square-wave of 1000 Hz was applied to the liquid crystal display panel 1, to obtain the plot of voltage versus liquid crystal phase difference as shown in FIG. 4. Here, when an applied high-frequency voltage was used to measure the phase difference of the liquid crystal display panel, ions in the alignment film and the liquid crystal molecules may not keep up the frequency switching speed, and therefore not contribute to the phase difference of the liquid crystal layer. Thus, FIG. 4 can be regarded as a plot of an applied voltage versus liquid crystal phase difference free from the ionic influence. The maximum slope in the curve of FIG. 4 is present at the applied voltage of about 3V, at which the liquid crystal molecules had the largest variation in phase difference. Accordingly, the applied voltage of 3V is employed for subsequent measurement.

Figure 5:
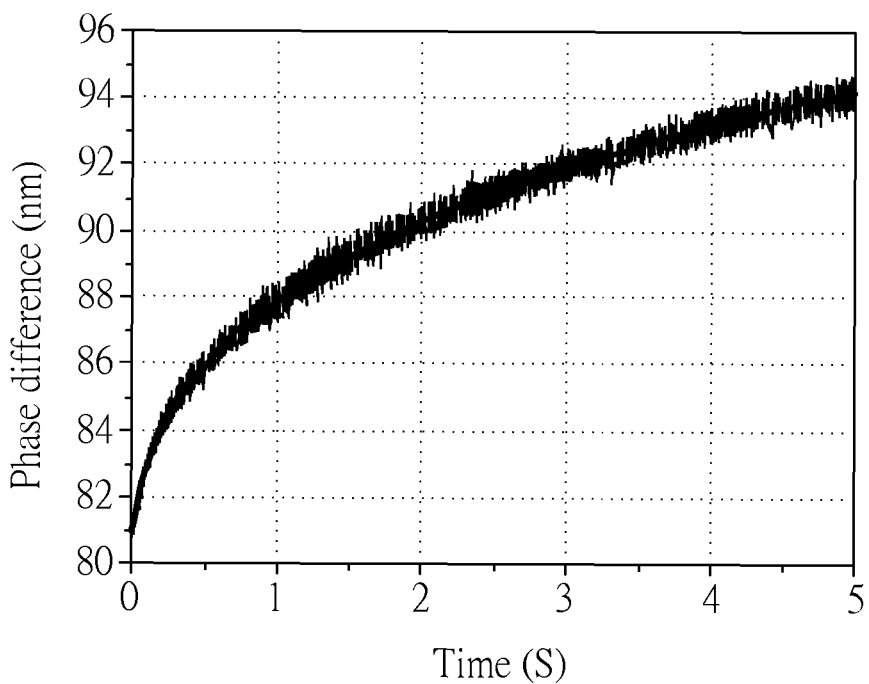
FIG. 5 shows a plot of time versus liquid crystal phase difference according to a test example of the disclosure.

Then, the phase difference measurement system as shown in FIG. 3A was employed again, to provide a voltage having a working frequency greater than 0 Hz and less than 10 Hz to the liquid crystal display panel 1, so as to obtain a plot of time versus liquid crystal phase difference (ΔPhase vs. Time). In this test example, a voltage of 3V having a square-wave of 0.1 Hz was applied to the liquid crystal display panel 1, to obtain the plot of time versus liquid crystal phase difference as shown in FIG. 5. Here, when a low-frequency applied voltage was used to measure the phase difference of the liquid crystal display panel, ions in the alignment film and the liquid crystal molecules may enhance the applied voltage and contribute to the optical phase difference of the liquid crystal layer. As such, FIG. 5 can be regarded as a plot of an ion influenced, applied voltage versus liquid crystal phase difference.

Figure 6:
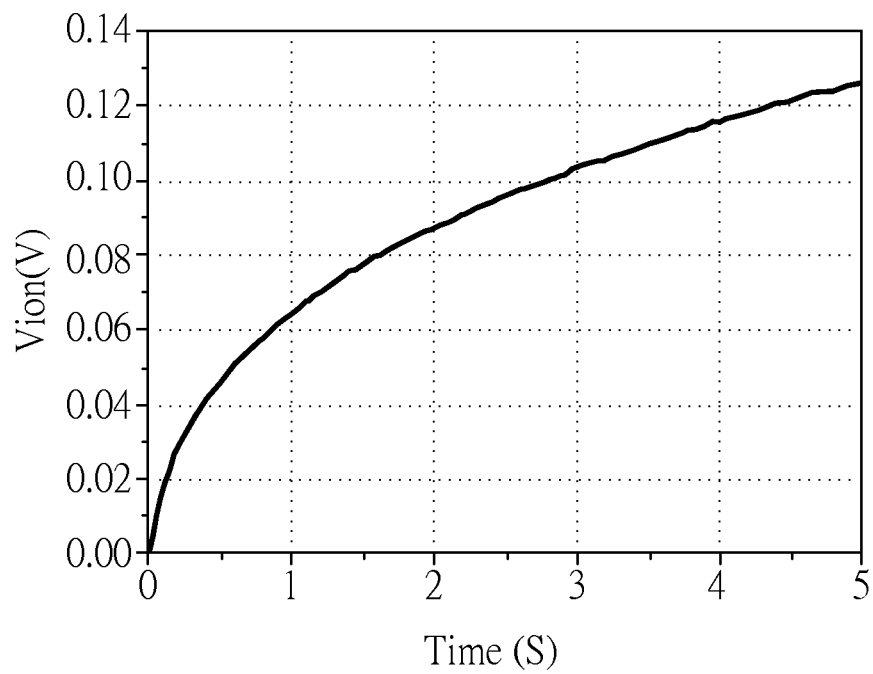
FIG. 6 shows a plot of time versus ionic electric potential difference according to a test example of the disclosure.

Next, the plot of voltage versus liquid crystal phase difference of FIG. 4 is compared with the plot of time versus liquid crystal phase difference of FIG. 5, to obtain a plot of time versus ionic electric potential difference (ΔVoltage vs. Time) as shown in FIG. 6. For example, the phase difference at 3rd second is approximately 92 nm, and 92 nm corresponds to a voltage of about 3.11V with reference to FIG. 4. Because the voltage for the measurement of the voltage versus liquid crystal phase difference in FIG. 5 is 3V, it can be known that in FIG. 5 when the phase difference at 3rd second is approximately 92 nm, the electric potential difference contributed by ions is 0.11 V, thus giving the data point having an ionic electric potential difference of 0.11V at 3rd second in FIG. 6. As such, the plot of time versus ionic electric potential difference in FIG. 6 in the present test example is obtained by calculating the electric potential difference contributed by ions at each time point. Since the electric field influencing the optical phase difference of the liquid crystal layer is an electric field obtained by the balanced charge at the interfaces between the first alignment film and second alignment film, the plot of time versus ionic electric potential difference (b) in FIG. 6 may also be represented by the following Equation (2)

$$B = V_{ion\_Pl}(1/2N) - V_{ion\_LC}(1/2N) \qquad (2)$$

wherein 0.1≤N≤30, $V_{ion\_LC}$ (1/2N) refers to the ionic electric potential of the liquid crystal layer at the time of 1/2N, and $V_{ion\_Pl}$(1/2N) refers to the ionic electric potential of the alignment film at the time of 1/2N.

Since the dielectric constant of the liquid crystal capacitance may be varied with the variations of voltage, frequency and temperature, at a low frequency, the liquid crystal capacitance cannot be measured using the aforementioned phase difference measurement method. Therefore, in this test example, the capacitance and current of the entire liquid crystal layer is measured by the liquid crystal current measurement system as shown in FIG. 2A. The rotation of the liquid crystal molecules may change their dielectric constant, and as a result, more charges are required to compensate for the rotation impact of the liquid crystal molecules. Therefore, the measured capacitance and current are sums of the capacitance and current caused by ions of the alignment film and the liquid crystal molecules and the rotation of the liquid crystal molecules.

Figure 7:
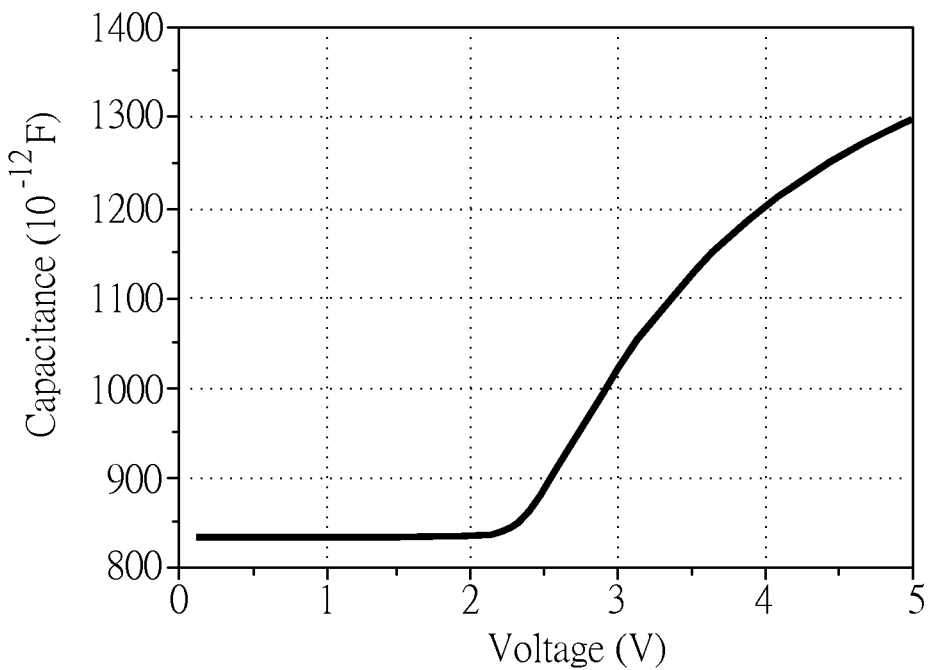
FIG. 7 shows a plot of voltage versus liquid crystal capacitance according to a test example of the disclosure.

First, the liquid crystal current measurement system shown in FIG. 2A is employed to apply a voltage having an operating frequency greater than or equal to 60 Hz and less than or equal to 5000 Hz to the liquid crystal display panel 1, to obtain a plot of voltage versus liquid crystal capacitance (Capacitance vs. Voltage). In this test example, a voltage of 0V to 5V having a square-wave of 1000 Hz was applied to the liquid crystal display panel 1, to obtain the plot of voltage versus liquid crystal capacitance as shown in FIG. 7. Here, because the ionic characteristics at a high frequency may be neglected, the voltage of the horizontal axis is the voltage provided by the liquid crystal current measurement system.

Figure 8:
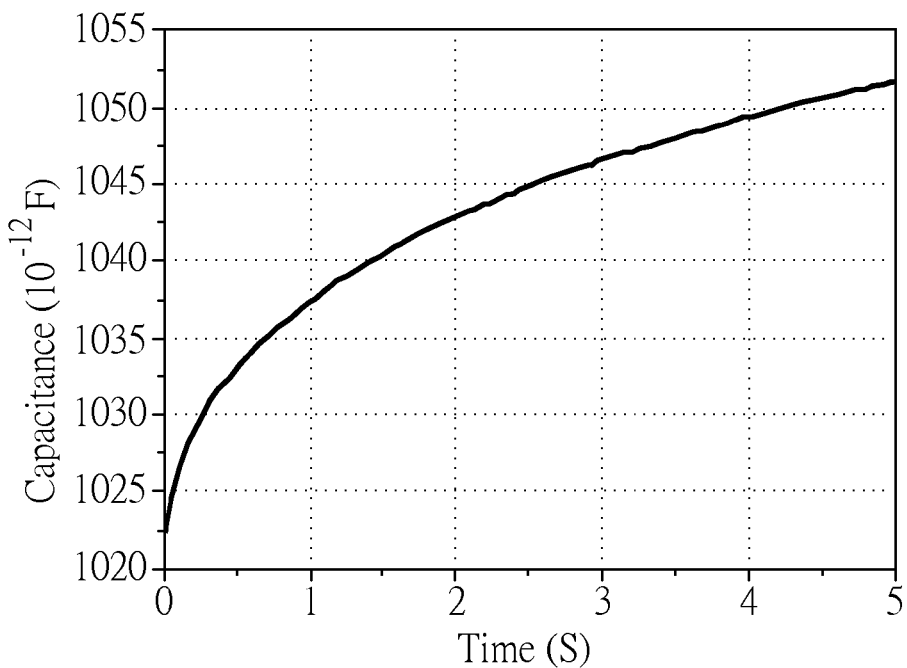
FIG. 8 shows a plot of time versus liquid crystal capacitance according to a test example of the disclosure.

Next, the plot of time versus ionic electric potential difference of FIG. 6 is compared with the plot of time versus liquid crystal capacitance of FIG. 7, to obtain a plot of time versus liquid crystal capacitance (ΔC vs. Time) as shown in FIG. 8. For example, the ionic electric potential difference at 1st second is approximately 0.065V. Because the ionic electric potential difference in FIG. 6 is obtained at 3V, compared with the liquid crystal capacitance of FIG. 7, the liquid crystal capacitance of 3+0.065V corresponds to a capacitance of $1037 \times 10^{-12}$F, thus giving the data point having a liquid crystal capacitance of $1037 \times 10^{-12}$F at 1st second in FIG. 8. As a result, the plot of time versus liquid crystal capacitance in FIG. 8 in the present test example is obtained by calculating the liquid crystal capacitance at each time point.

Figure 9:
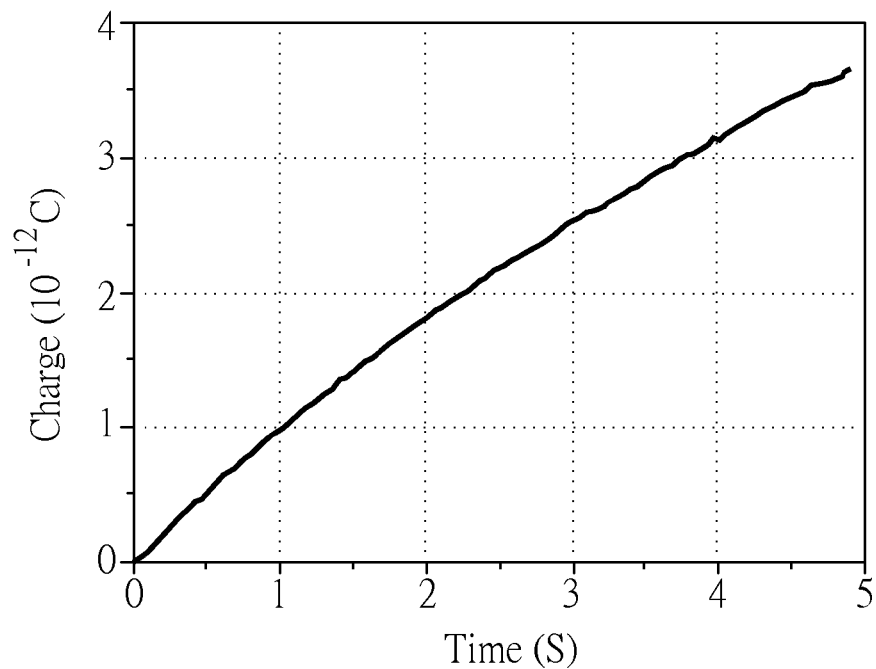
FIG. 9 shows a plot of time versus charge required for twisting liquid crystal molecules according to a test example of the disclosure.

Then, the plot of time versus liquid crystal capacitance in FIG. 8 is compared with the plot of time versus ionic electric potential difference of FIG. 6, to obtain a plot of time versus charge required for twisting liquid crystal molecules ($\Delta Q_{LC\_deform}$), as shown in FIG. 9, through the following Equation (5):

$$\Delta Q_{LC\_deform} = \Delta C_{LC} \times \Delta V \qquad (5)$$

wherein, ΔV refers to the variation of the ionic electric potential difference per second at each corresponding time at 3V as shown in FIG. 6, and $\Delta C_{LC}$ refers to the capacitance difference between each time point and one second before the time point. For example, in FIG. 6, the ionic electric potential difference at the 1st second is approximately 0.065V, while in FIG. 8, the capacitance difference between the 1st second and 0th second is $15 \times 10^{-12}$F (($(1037-1022) \times 10^{-12}$F), thus giving $\Delta Q_{LC\_deform}$ of $0.975 \times 10^{-12}$C according to the Equation (5). By calculating the product of the capacitance variation and the electric potential difference at each time point, the plot of time versus charge required for twisting liquid crystal molecules ($\Delta Q_{LC\_deform}$) of FIG. 9 in this test example is obtained.

Figure 10:
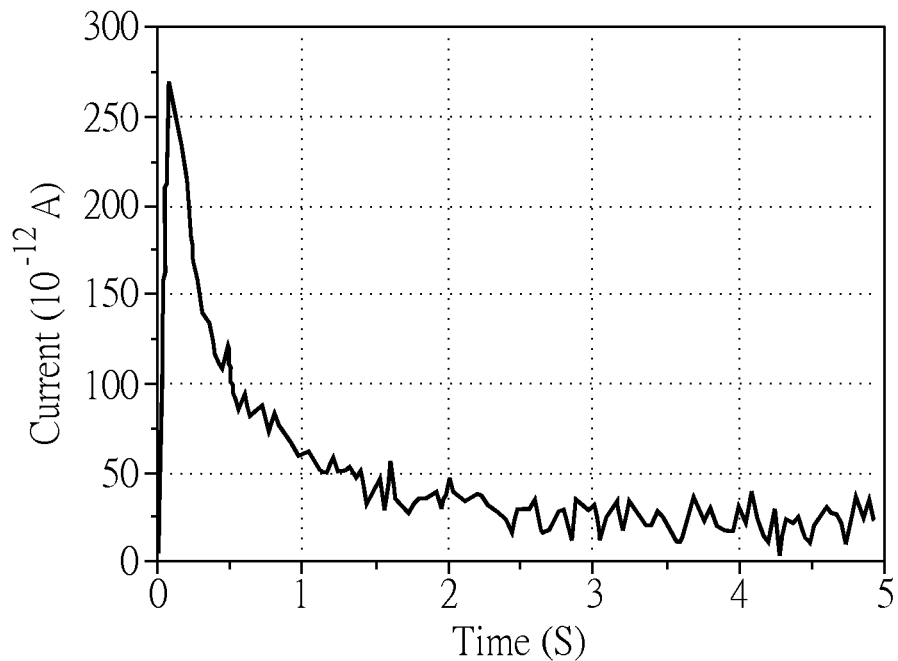
FIG. 10 shows a plot of time versus current passing through the display panel according to a test example of the disclosure.
Figure 11:
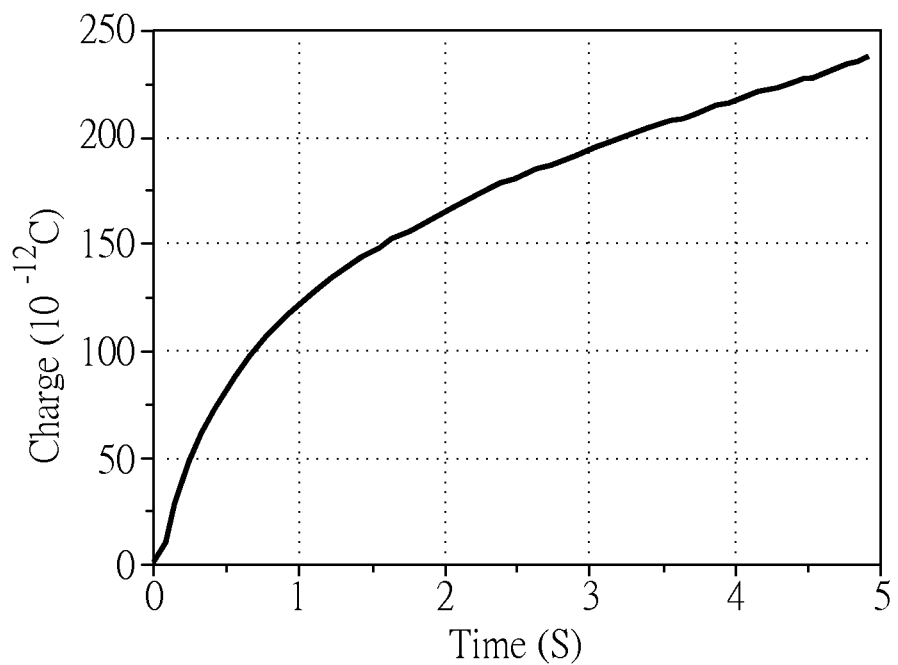
FIG. 11 shows a plot of time versus charge passing through the display panel according to a test example of the disclosure.
Figure 12:
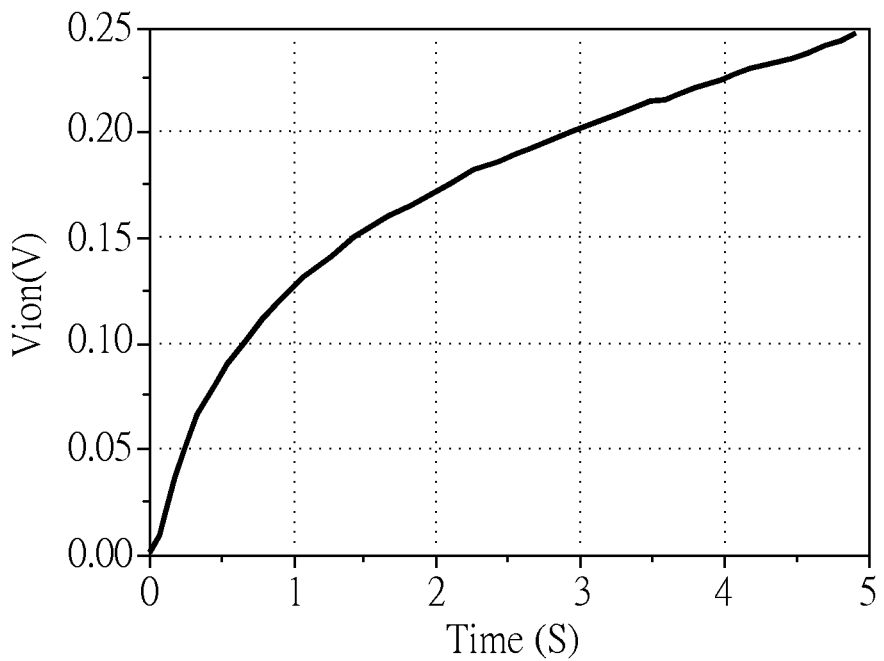
FIG. 12 shows a plot of time versus sum of ionic electric potentials according to a test example of the disclosure.

Next, the liquid crystal current measurement system shown in FIG. 2A is employed to measure the integral current flowing through the liquid crystal display panel 1 with the same voltage signal used to measure the plot of time versus liquid crystal phase difference, that is, a voltage having a frequency greater than 0 Hz and less than 10 Hz. In this test example, a voltage having a square-wave of 0.1 Hz was applied to the liquid crystal display panel 1, to obtain the plot of time versus current passing through the display panel of FIG. 10, followed by time integration of current, to obtain the plot of time versus charge passing through the display panel, as shown in FIG. 11. Here, charge passing through the display panel obtained in FIG. 11 is sum of the charges caused by ions of the alignment film and the liquid crystal molecules and the rotation of the liquid crystal molecules. Therefore, the sum of the charges in FIG. 11 minus the charges required for twisting liquid crystal molecules in FIG. 9 equals the sum of charges caused by ions of the alignment film and the liquid crystal molecules, which is then converted into the equivalent capacitance at low frequency by Debye Model. As such, the sum of charges caused by ions of the alignment film and the liquid crystal molecules is converted into the sum of ionic electric potentials caused by ions of the alignment film and the liquid crystal molecules, FIG. 12 shows the plot of time versus sum of ionic electric potentials of FIG. 12, which may also be represented by the following Equation (1):

$$A = V_{ion\_PI}(1/2N) + V_{ion\_LC}(1/2N) \quad (1)$$

wherein $0.1 \leq N \leq 30$, $V_{ion\_LC}(1/2N)$ refers to an ionic electric potential of the liquid crystal layer at a time of $1/2N$, and $V_{ion\_PI}(1/2N)$ refers to an ionic electric potential of the first alignment film at a time of $1/2N$.

Finally, the sum A of an ionic electric potential of the liquid crystal layer at a time of $1/2N$ and an ionic electric potential of the alignment film at the time of $1/2N$ is obtained by the Equation (1); and the difference B between the ionic electric potential of the liquid crystal layer at the time of $1/2N$ and the ionic electric potential of the alignment film at the time of $1/2N$ is obtained by the Equation (2). In addition, the ionic electric potential ($V_{ion\_PI}$) of the alignment film at the time of $1/2N$ and the ionic electric potential ($V_{ion\_LC}$) of the liquid crystal layer at the time of $1/2N$ are obtained via the following Equation (3) and Equation (4):

$$V_{ion\_PI}(1/2N) = (A+B)/2 \quad (3)$$

$$V_{ion\_LC}(1/2N) = (A-B)/2 \quad (4).$$

Comparative Example

Figure 13:
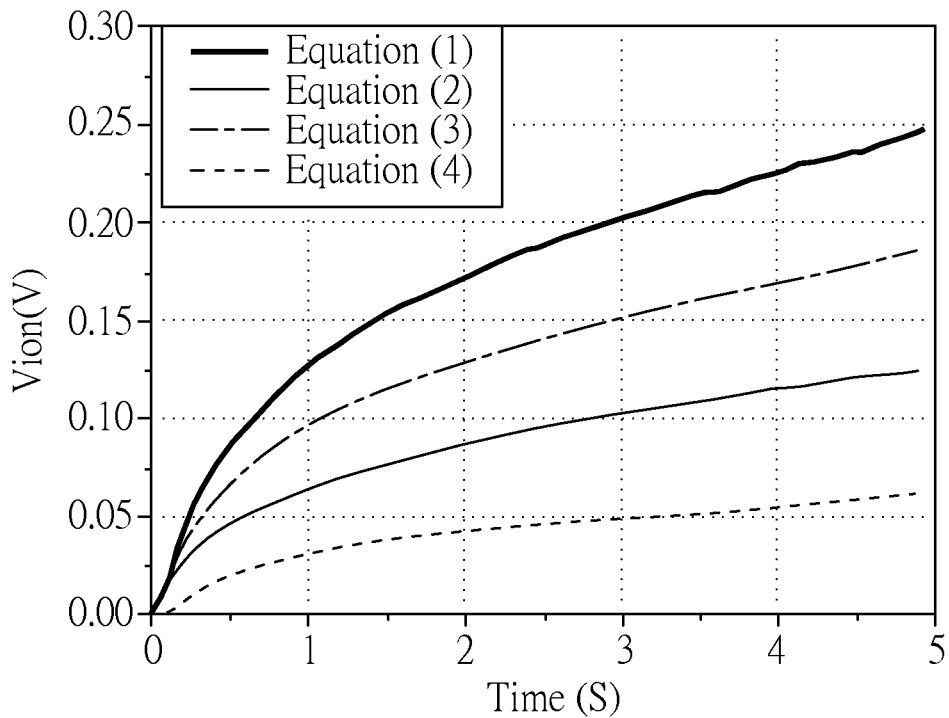
FIG. 13 shows a plot of time versus ionic electric potential difference according to a comparative example of the disclosure.

The liquid crystal display panel used in this comparative example has the same structure as in the test example, as shown in FIG. 1A. In this comparative example, the liquid crystal display panel employed a 8 ms TN liquid crystal and an alignment film having a low impedance. Through the same detecting method as in the test example, in a detection environment of 25° C., the plot of time versus ion electric potential difference, ionic electric potential sum, liquid crystal ionic electric potential and alignment film ionic electric potential can be obtained as shown in FIG. 13. In FIG. 13, the curve indicated by the Equation (1) refers to the curve of time versus the sum of an ionic electric potential of the liquid crystal layer and the alignment film, the curve indicated by the Equation (2) refers to the curve of time versus the ionic electric potential difference between the liquid crystal layer and the alignment film, the curve indicated by the Equation (3) refers to the curve of time versus ionic electric potential of the alignment film, and the curve indicated by the Equation (4) refers to the curve of time versus ionic electric potential of the liquid crystal layer. As shown in FIG. 13, the curves indicated by the Equations (3) and (4) are not overlapped with each other, indicating that the ions of the liquid crystal layer and ions of the alignment film cannot balance each other. This represents that flicker may occur when the liquid crystal display panel of the Comparative Example is operated at a low frequency.

Example

Figure 14:
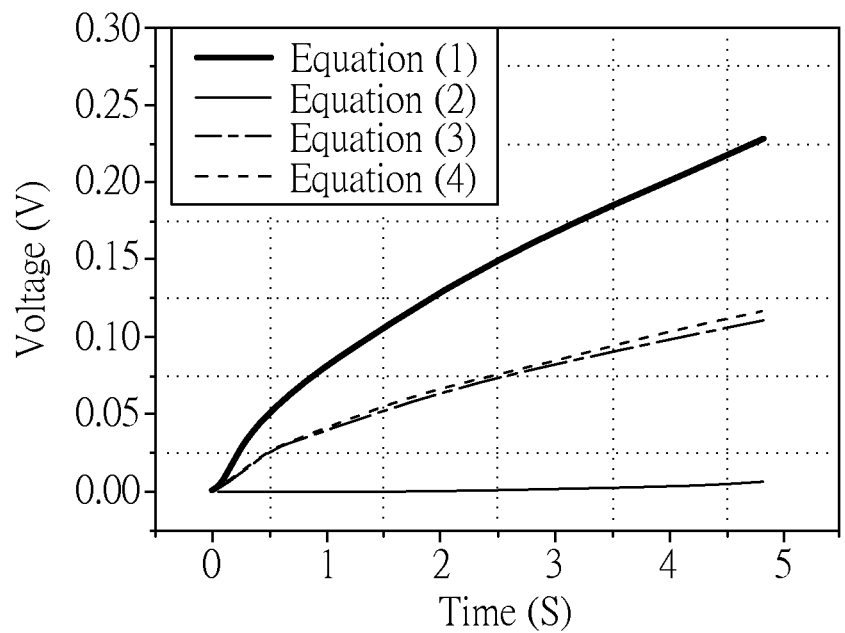
FIG. 14 shows a plot of time versus ionic electric potential and ionic electric potentials of the liquid crystal and alignment film according to a preferred example of the disclosure.

The liquid crystal display panel used in this example is the same as in the test example, as shown in FIG. 1A. In this example, the liquid crystal display panel employed the 8ms TN liquid crystal and an alignment film having a high impedance. Through the same detecting method as in the test example, in a detection environment of 25° C., the plot of time versus ion electric potential difference, ionic electric potential sum, liquid crystal ionic electric potential and alignment film ionic electric potential can be obtained as shown in FIG. 14. In FIG. 14, the curve indicated by the Equation (1) refers to the curve of time versus the sum of an ionic electric potential of the liquid crystal layer and the alignment film, the curve indicated by the Equation (2) refers to the curve of time versus the ionic electric potential difference between the liquid crystal layer and the alignment film, the curve indicated by the Equation (3) refers to the curve of time versus ionic electric potential of the alignment film, and the curve indicated by the Equation (4) refers to the curve of time versus ionic electric potential of the liquid crystal layer. As shown in FIG. 14, the curves indicated by the Equations (3) and (4) are substantially overlapped with each other, indicating that the ions of the liquid crystal layer and ions of the alignment film can balance each other. This represents that flicker would not occur when the liquid crystal display panel of this Example is operated at a low frequency.

Particularly, when the liquid crystal display panel of the disclosure is operated at a working frequency of N Hz, the ionic electric potentials of the liquid crystal layer and the first alignment film satisfy the following Equation (I):

$$0 \leq \left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right| \leq 0.5 \quad (I)$$

wherein, $0.1 \leq N \leq 30$, $V_{ion\_LC}(1/2N)$ refers to an ionic electric potential of the liquid crystal layer at a time of $1/2N$, and $V_{ion\_PI}(1/2N)$ refers to an ionic electric potential of the first alignment film at a time of $1/2N$. In this example, when the liquid crystal display panel is operated at a working frequency of 0.1 Hz, $$\left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right|$$

is about 0.

In another example, $$\left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right|$$

ranges between 0 and 0.3 (greater than or equal to 0 and less than or equal to 0.3).

Figure 15:
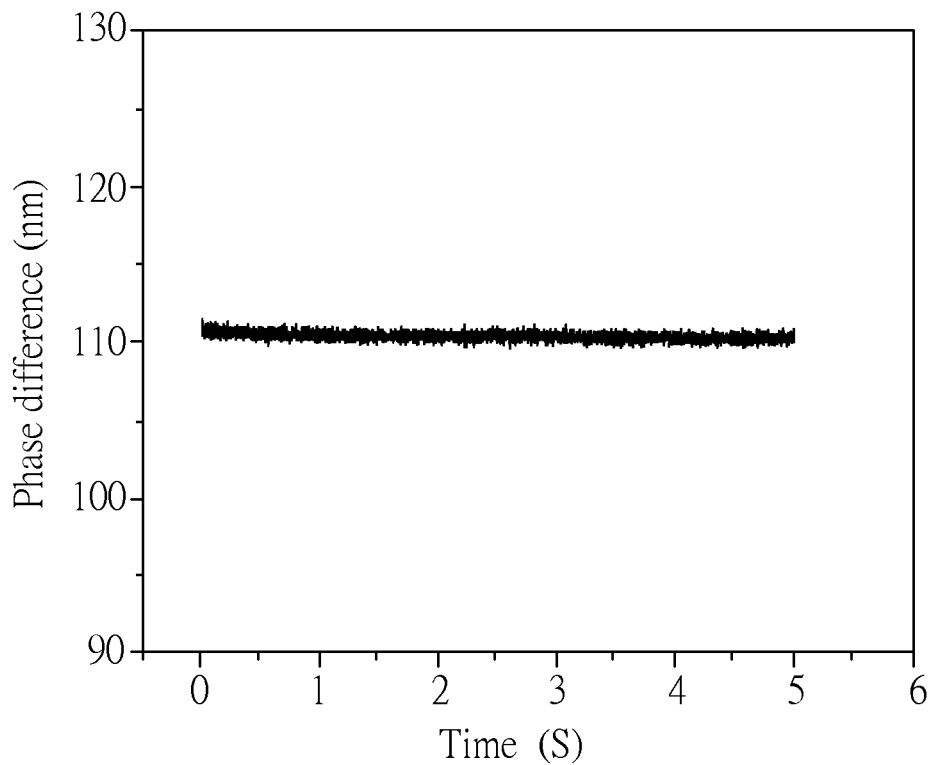
FIG. 15 shows a plot of time versus phase difference according to a preferred example of the disclosure.

The overall phase difference is measured by the phase difference measurement system as shown in FIG. 3 in a detection environment of 25° C., with a detection voltage of 1.8V having a frequency of 0.1 Hz to obtain the plot of time versus phase difference as shown in FIG. 15. As shown in FIG. 15, the liquid crystal display panel of this Example is operated at a low frequency, the phase difference is not significantly changed, indicating that flicker would not occur in the liquid crystal display panel of this Example.

In summary, the disclosure provides a detection method for efficiently monitoring the individual ion influence of the liquid crystal or the alignment film, through which suitable materials of the liquid crystal layer and the alignment film can be selected to minimize the ion impact on the panel. Specifically, the suitable materials of the liquid crystal layer and the alignment film designed and exploited by the detection method of the disclosure satisfy the aforementioned Equation (I), and therefore in the power saving operation at a low frequency, the variation in light transmission of the panel due to the electric field generated by the ions of the liquid crystal layer molecules and the alignment film can be avoided, thereby preventing flicker of the liquid crystal display panel.

Figure 16:
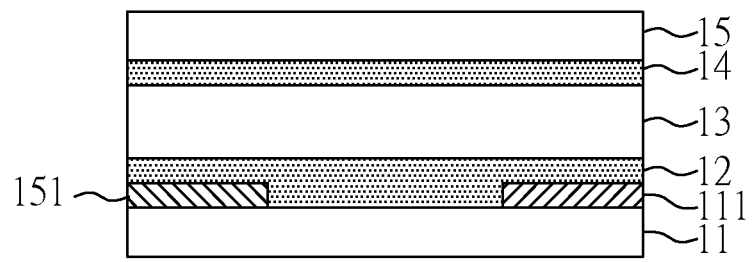
FIG. 16 shows a schematic diagram of the liquid crystal display panel according to another preferred example of the disclosure.
Figure 17:
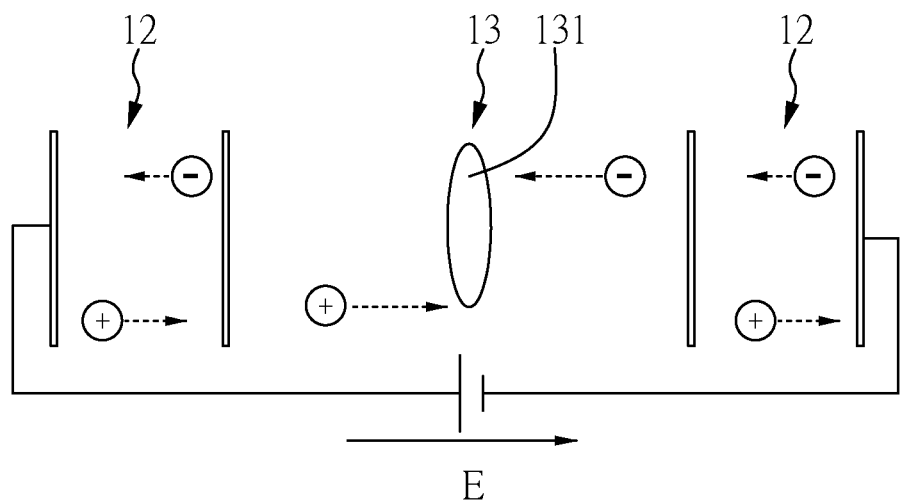
FIG. 17 shows a schematic diagram of the phase difference generated in the liquid crystal display panel according to another preferred example of the disclosure.

FIG. 16 shows a schematic diagram of the liquid crystal display panel according to another preferred example of the disclosure, which is substantially the same as the aforementioned example, except that the liquid crystal display panel is a horizontal alignment (In-Plane-Switching, IPS) liquid crystal display panel. In this example, the first electrode 111 and second electrode 151 are both disposed on the first substrate 11, and a first alignment film 12 is provided on the first electrode 111 and the second electrode 151, that is, a first alignment film 12 is disposed between the first electrode 111 and the second electrode 151. When an operating voltage is applied to the first electrode 111 and the second electrode 151 to provide an electric potential difference, the liquid crystal molecules 131 of the liquid crystal layer 13 are rotated by the electric field E generated between the first electrode 111 and the second electrode 151, and the ions of the liquid crystal layer 13 and the first alignment film 12 between the first electrode 111 and the second electrode 151 having different electric potentials will also be influenced by the electric field to affect the liquid crystal rotation, thereby affecting the display quality. The movement of the ions is shown in FIG. 17, wherein the liquid crystal molecules 131 are for illustrative purposes only and are not intended to limit the liquid crystal molecules to be the positive- or negative-type liquid crystal. Therefore, in this example, the ionic electric potentials of the liquid crystal layer and the alignment film are designed to comply with the conditions of the Equation (I), to avoid flicker of the liquid crystal display panel in a low-frequency operation.

The display panel prepared by the aforementioned example of the disclosure can be applied to any conventional electronic device requiring a display screen, such as a monitor, a cell phone, a notebook computer, a camcorder, a camera, a music player, a mobile navigation device, a television, and so on.

Although the disclosure has been explained in relation to its preferred embodiment, it is to be understood that many other possible modifications and variations can be made without departing from the spirit and scope of the invention as hereinafter claimed.

What is claimed is:

1. A liquid display panel, comprising:
a first substrate;
a second substrate disposed opposite to the first substrate;
a first electrode disposed between the first substrate and the second substrate;
a second electrode disposed between the first substrate and the second substrate, wherein the first electrode and the second electrode have different electric potentials;
a first alignment film disposed between the first electrode and the second electrode; and
a liquid crystal layer disposed between the first substrate and the second substrate,
wherein when a working frequency of the liquid crystal display panel is N Hz, ionic electric potentials of the liquid crystal layer and the first alignment film satisfy the following Equation (I):

$$0 \leq \left| \frac{V_{ion\_LC}\left(\frac{1}{2N}\right) - V_{ion\_PI}\left(\frac{1}{2N}\right)}{V_{ion\_LC}\left(\frac{1}{2N}\right) + V_{ion\_PI}\left(\frac{1}{2N}\right)} \right| \leq 0.5 \qquad (I)$$

wherein $0.1 \leq N \leq 30$, $V_{ion\_LC}$ (1/2N) refers to an ionic electric potential of the liquid crystal layer at a time of 1/2N, and $V_{ion\_PI}$(1/2N) refers to an ionic electric potential of the first alignment film at a time of 1/2N.

2. The liquid crystal display panel of claim 1, wherein the first electrode and the second electrode are disposed on the first substrate.

3. The liquid crystal display panel of claim 1, wherein the first electrode is disposed on the first substrate, and the second electrode is disposed on the second substrate.

4. The liquid crystal display panel of claim 1, further comprising a second alignment film disposed between the first electrode and the second electrode and opposite to the first alignment film, and the liquid crystal layer is disposed between the first alignment film and the second alignment film.

5. A method for detecting an electric potential generated by ions between a liquid crystal layer and an alignment film in a liquid crystal display panel, comprising the following steps:
providing a liquid crystal display panel, comprising: a first substrate; a second substrate disposed opposite to the first substrate; a first electrode disposed between the first substrate and the second substrate; a second electrode disposed between the first substrate and the second substrate, wherein the first electrode and the second electrode have different electric potentials; a first alignment film disposed between the first electrode and the second electrode; and a liquid crystal layer disposed between the first substrate and the second substrate;

measuring the liquid crystal display panel by a liquid crystal current measurement method, to obtain a sum A of an ionic electric potential of the liquid crystal layer at a time of 1/2N and an ionic electric potential of the first alignment film at the time of 1/2N, as shown in the following Equation (1); and measuring the liquid crystal display panel by a phase difference measurement method, to obtain a difference B between the ionic electric potential of the liquid crystal layer at the time of 1/2N and the ionic electric potential of the first alignment film at the time of 1/2N, as shown in the following Equation (2):

$$A = V_{ion\_Pl}(1/2N) + V_{ion\_LC}(1/2N) \quad (1)$$

$$B = V_{ion\_Pl}(1/2N) - V_{ion\_LC}(1/2N) \quad (2)$$

wherein $0.1 \leq N \leq 30$, $V_{ion\_LC}(1/2N)$ refers to the ionic electric potential of the liquid crystal layer at the time of 1/2N, and $V_{ion\_Pl}(1/2N)$ refers to the ionic electric potential of the first alignment film at the time of 1/2N; and obtaining the ionic electric potential of the first alignment film at the time of 1/2N and the ionic electric potential of the liquid crystal layer at the time of 1/2N via the following Equation (3) and Equation (4):

$$V_{ion\_Pl}(1/2N) = (A+B)/2 \quad (3)$$

$$V_{ion\_LC}(1/2N) = (A-B)/2 \quad (4)$$

wherein when a working frequency of the liquid crystal display panel is N Hz, the ionic electric potentials of the liquid crystal layer and the first alignment film satisfy the following Equation (I):

$$0 \leq \left| \frac{V_{ion\_LC}\left(\frac{1}{2N}\right) - V_{ion\_Pl}\left(\frac{1}{2N}\right)}{V_{ion\_LC}\left(\frac{1}{2N}\right) + V_{ion\_Pl}\left(\frac{1}{2N}\right)} \right| \leq 0.5. \quad (I)$$

6. The method of claim 5, wherein the phase difference measurement method for measuring the liquid crystal display panel to obtain the difference B between the ionic electric potentials of the liquid crystal layer and the first alignment film comprises the following steps:

applying a voltage having an operating frequency greater than or equal to 60 Hz and less than or equal to 5000 Hz to the liquid crystal display panel, to obtain a plot of voltage versus liquid crystal phase difference;

applying a voltage having an operating frequency greater than 0 Hz and less than 10 Hz to the liquid crystal display panel, to obtain a plot of time versus liquid crystal phase difference; and comparing the plot of voltage versus liquid crystal phase difference with the plot of time versus liquid crystal phase difference, to obtain a plot of time versus ionic electric potential difference.

7. The method of claim 6, wherein the liquid crystal current measurement method for measuring the liquid crystal display panel to obtain the sum A of the ionic electric potentials of the liquid crystal layer and the first alignment film comprises the following steps:

applying a voltage having an operating frequency greater than or equal to 60 Hz and less than or equal to 5000 Hz to the liquid crystal display panel, to obtain a plot of voltage versus liquid crystal capacitance;

obtaining a plot of time versus liquid crystal capacitance, from the plot of time versus ionic electric potential difference and the plot of voltage versus liquid crystal capacitance;

obtaining a plot of time versus charge required for twisting liquid crystal molecules from the plot of time versus liquid crystal capacitance and the plot of time versus ionic electric potential difference; and obtaining a plot of time versus sum of ionic electric potentials from the plot of time versus charge required for twisting liquid crystal molecules and a plot of time versus current passing through the display panel.

8. The method of claim 5, wherein the first electrode and the second electrode are disposed on the first substrate.

9. The method of claim 5, wherein the first electrode is disposed on the first substrate, and the second electrode is disposed on the second substrate.

10. The method of claim 5, further comprising a second alignment film disposed between the first electrode and the second electrode and opposite to the first alignment film, and the liquid crystal layer is disposed between the first alignment film and the second alignment film.

* * * * *